United States Patent
Desclos et al.

(10) Patent No.: US 9,559,756 B2
(45) Date of Patent: Jan. 31, 2017

(54) ANTENNA SYSTEM OPTIMIZED FOR SISO AND MIMO OPERATION

(71) Applicant: Ethertronics, Inc., San Diego, CA (US)

(72) Inventors: Laurent Desclos, San Diego, CA (US); Sebastian Rowson, San Diego, CA (US); Jeffrey Shamblin, San Marcos, CA (US)

(73) Assignee: ETHERTRONICS, INC., San Diego, CA (US)

(*) Notice: Subject to any disclaimer, the term of this patent is extended or adjusted under 35 U.S.C. 154(b) by 1081 days.

(21) Appl. No.: 13/621,811

(22) Filed: Sep. 17, 2012

(65) Prior Publication Data

US 2013/0109449 A1    May 2, 2013

Related U.S. Application Data

(63) Continuation-in-part of application No. 13/029,564, filed on Feb. 17, 2011, now Pat. No. 8,362,962, which is a continuation of application No. 12/043,090, filed on Mar. 5, 2008, now Pat. No. 7,911,402, application No. 13/621,811, which is a continuation-in-part of application No. 13/289,901, filed on Nov. 4, 2011, now Pat. No. 8,717,241, which is a continuation of application No. 12/894,052, filed on Sep. 29, 2010, now Pat. No. 8,077,116, which is a continuation of application No. 11/841,207, filed on Aug. 20, 2007, now Pat. No. 7,830,320, application No. 13/621,811, which is a continuation-in-part of application No. 13/227,361, filed on Sep. 7, 2011, now abandoned.

(Continued)

(51) Int. Cl.
H04B 7/185    (2006.01)
H04B 7/04     (2006.01)
H01Q 1/24     (2006.01)
H01Q 3/00     (2006.01)
H01Q 9/04     (2006.01)

(52) U.S. Cl.
CPC ............ H04B 7/0413 (2013.01); H01Q 1/243 (2013.01); H01Q 3/00 (2013.01); H01Q 9/0421 (2013.01)

(58) Field of Classification Search
CPC . H04W 52/241; H04W 52/243; H04B 7/0413; H04B 17/318
USPC ... 455/13.3, 25, 63.4, 575.7, 279.1; 343/893
See application file for complete search history.

(56) References Cited

U.S. PATENT DOCUMENTS

| | | | | |
|---|---|---|---|---|
| 7,265,714 B2 * | 9/2007 | Goldberg | ............. | H04B 7/0413 342/377 |
| 7,330,152 B2 * | 2/2008 | Zhang | .................... | H01Q 3/24 343/700 MS |

(Continued)

*Primary Examiner* — Sonny Trinh
(74) *Attorney, Agent, or Firm* — Coastal Patent Law Group, P.C.

(57) ABSTRACT

An active antenna system and algorithm is described that provides for improved performance from LTE communication systems operating in Category 1 mode, where one antenna is used. For the LTE SISO case (category 1), a modal antenna capable of generating multiple radiation patterns will provide improved throughput due to improved resistance to fading. Modal (Null Steering) antenna technology is implemented in a multi-antenna system to provide for single and multiple antenna operation wherein one or more antennas have two or more radiation modes. An algorithm has been developed that determines when to switch from SISO to MIMO operation.

8 Claims, 8 Drawing Sheets

Related U.S. Application Data

(60) Provisional application No. 61/535,360, filed on Sep. 16, 2011, provisional application No. 61/683,673, filed on Aug. 15, 2012.

(56) References Cited

U.S. PATENT DOCUMENTS

| | | | | |
|---|---|---|---|---|
| 7,787,554 B1 * | 8/2010 | Nabar | ................. | H04B 7/0874 375/267 |
| 8,570,231 B2 * | 10/2013 | Desclos | ................... | H01Q 9/06 343/745 |
| 8,615,268 B2 * | 12/2013 | Sugiyama | .............. | H04B 7/022 370/311 |
| 2013/0095832 A1 * | 4/2013 | Cheng | ............... | H04W 36/0088 455/436 |

* cited by examiner

3GPP standard defining 5 categories of operation on the mobile side of communication link

[Tables: Downlink and Uplink physical layer parameter values set by the field ue-Category]

Option 1: Cat 1 – SISO with Modal antenna system. Minimum power consumed

Option 2: Cat 2 – MIMO with passive antennas. Default mode if Modal function (Null Steering) turned off.

Option 3: Cat 2 – MIMO with one passive, one Modal antenna. Improved throughput mode

Option 4: Cat 2 – MIMO with two Modal antennas. Maximum throughput mode

FIG.3

ANTENNA SYSTEM OPTIMIZED FOR SISO AND MIMO OPERATION

CROSS-REFERENCE TO RELATED APPLICATIONS

This application is a continuation-in-part of U.S. patent application Ser. No. 13/029,564, filed Feb. 17, 2011, titled "ANTENNA AND METHOD FOR STEERING ANTENNA BEAM DIRECTION", which is a CON of U.S. patent application Ser. No. 12/043,090, filed Mar. 5, 2008, titled "ANTENNA AND METHOD FOR STEERING ANTENNA BEAM DIRECTION", now U.S. Pat. No. 7,911,402, issued Mar. 22, 2011;

a continuation-in-part of U.S. patent application Ser. No. 12/894,052, filed Sep. 29, 2010, titled "ANTENNA WITH ACTIVE ELEMENTS", which is a CON of U.S. patent application Ser. No. 11/841,207, filed Aug. 20, 2007, titled "ANTENNA WITH ACTIVE ELEMENTS", now U.S. Pat. No. 7,830,320, issued Nov. 9, 2010;

a continuation-in-part of U.S. patent application Ser. No. 13/227,361, filed Sep. 7, 2011, titled "MODAL ANTENNA WITH CORRELATION MANAGEMENT FOR DIVERSITY APPLICATIONS"; and claims benefit of priority to U.S. Provisional Ser. No. 61/535,360, filed Sep. 16, 2011, titled "APPLICATIONS AND METHODS FOR NULL STEERING ANTENNA SYSTEMS"; and claims benefit of priority to U.S. Provisional Ser. No. 61/683,673, filed Aug. 15, 2012, titled "ANTENNA SYSTEM OPTIMIZED FOR SISO AND MIMO OPERATION";

the contents of each of which are hereby incorporated by reference.

FIELD OF INVENTION

The present invention relates generally to the field of wireless communication. In particular, the present invention relates to antenna implementations capable of multi-band operation for use in wireless communications.

BACKGROUND OF THE INVENTION

Current and future communication systems will require MIMO antenna systems capable of operation over multiple frequency bands. Isolation between adjacent elements as well as de-correlated radiation patterns will need to be maintained across multiple frequency bands, with antenna efficiency needing to be optimized for the antenna system.

In many instances, the line of sight between a transmitter and a receiver involved in the communication becomes blocked or shadowed with obstacles such as walls and other objects. Each signal bounce may introduce phase shifts, time delays, attenuations and distortions, which ultimately interfere at the receiving antenna. Destructive interference in the wireless link is problematic and results in degradation of device performance.

A signal quality metric is often used to assess the quality of signals. Examples of such quality metrics include signal-to-noise ratio (SNR), signal to interference-plus-noise ratio (SINR), receive signal strength indicator (RSSI), bit error rate (BER) and other metrics, which are called channel quality indicators (CQI). Multiple Input Multiple Output (MIMO) systems or antenna diversity schemes can be used to improve the quality and reliability of a wireless communication link.

An antenna diversity scheme can mitigate interference from multipath environments by monitoring one or more CQIs. Antenna diversity can be implemented generally in several forms, including spatial diversity, pattern diversity and polarization diversity. Each of these diversity schemes requires one or more processing techniques, such as switching, selecting and combining.

Switching is one of the simple and efficient processing techniques and generally includes receiving a signal from a first antenna until the signal level fades below a threshold, at which point active components such as switches engage the second antenna for communication with the receiver.

Selecting is a processing technique that determines an optimal signal for utilization by the receiver during each predetermined time interval. Both selecting and switching techniques may utilize active components, such as switches, to select the optimal signal based on one or more CQIs. The selecting and switching techniques may be collectively called a switching technique wherein the selection of the signal for utilization is carried out by controlling the switches or other active components coupled to the antennas.

Combining is a processing technique wherein the multiple signals at the receiver are weighted and combined into a signal for communication. The weights are adjusted such that a main lobe of a receiving beam pattern is toward the desired direction and a null of the receiving beam pattern is toward the interference direction. Examples of combining techniques include a minimum mean squared error (MMSE) combining technique, a maximum ratio combining (MRC) technique and an equal gain combining (EGC) technique.

In the diversity scenarios, the different signals received at the different antennas of the receiver are coming from the single transmitting antenna and contain the same message. The selecting or switching schemes may be adapted for Single Input Single Output (SISO) systems while the combining scheme may be adapted for Multiple Input Single Output (MISO) systems.

Different from diversity schemes, a MIMO system can mitigate interference from the multipath environment by using several transmit (Tx) antennas at the same time to transmit different signals, which are not identical but are different variants of the same message, and several receive (Rx) antennas at the same time to receive the different signals. A MIMO system can generally offer significant increase in data throughput without additional bandwidth or increased transmit power by spreading the same total transmit power over the antennas so as to achieve an array gain. MIMO protocols constitute a part of wireless communication standards such as IEEE 802.11n (WiFi), 4G, Long Term Evolution (LTE), WiMAX and HSPA+.

However, in a MIMO system, each radio link between one of the Rx antennas and one of the TX antennas may still face destructive interferences due to phase shifts, time delays, attenuations, distortions and various other electromagnetic effects as explained earlier. It is possible to improve the overall performance of the MIMO system by improving the quality and reliability of each link by using a selecting or switching diversity scheme, for example.

In Rx diversity for a conventional wireless mobile device, one or more diversity antennas are added in the device to support the diversity scheme. A MIMO system already uses multiple (N) antennas; thus, if each of the Rx antennas in the MIMO system needs one diversity antenna, the system would end up containing 2×N Rx antennas. In such a configuration with multiple antennas, size constraints may become significant, and coupling among the antennas as well as between the antennas and nearby electronics of a communication device may significantly deteriorate transmission and reception qualities. Additionally, efficiency may deteriorate in many instances where multiple paths are energized and power consumption increases. Implementing two, three or more diversity antennas may provide system flexibility, but the volume and area requirements become increasingly severe as additional antennas, associated components and transmission lines are needed. As such, mixing diversity and MIMO techniques has gained limited popularity thus far.

With Multiple Input Multiple Output (MIMO) systems recently becoming more prevalent in the cellular communication field, the need for two or more antennas collocated in a mobile device are becoming more common. These groups of antennas in a MIMO system need to have high, and preferably, equal efficiencies along with high isolation and low correlation. For handheld mobile devices the problem is exacerbated by antenna detuning caused by the multiple use cases of a device: hand loading of the cell phone, cell phone placed to user's head, cell phone placed on metal surface, etc. For cell phone applications, the multipath environment is constantly changing, which impacts throughput performance of the communication link.

The 3GPP LTE standard specifies five Categories of operation, each Category providing a different data rate for both uplink and downlink communication. The data rate increases as operation progresses from Category 1 to Category 5. Category 1 allows for SISO (Single Input Single Output) operation, which is defined as one antenna on the base station side of the communication link, and one antenna on the mobile side of the link, for example. Categories 2, 3, and 4 specify a maximum of a 2×2 MIMO antenna system, with two antennas on the base station side and two antennas on the mobile side. Category 5 specifies a maximum of 4×4 MIMO antenna system, with four antennas on the base station side and four antennas on the mobile side. It is important to reiterate that though most of the categories of operation for LTE communication systems require a MIMO antenna system, i.e. multiple antennas, Category 1 operation is specified in the standard which allows for single antenna operation if minimum data rates can be achieved. For a majority of cases, such as low signal strength regions, high multipath environments and issues involving deep signal fading, a single antenna will not provide the data rate required for Category 1 operation. In this case, additional antennas and communication ports are activated to improve system throughput.

Category 5 operation allows for a maximum of a 4×4 MIMO antenna system, with this Category providing the highest data rate of the five Categories. The problems associated with implementing four antennas in a mobile device for use in a cellular network are numerous: making volume internal to a mobile device available for four antennas, providing a four port transceiver configured for MIMO operation, the power consumption of a four port solution compared to a two port solution, and the difficulty of integrating four antennas into a mobile device while maintaining high isolation and low correlation between the antennas.

SUMMARY OF THE INVENTION

A multi-antenna system is described, wherein the antenna system can switch between one antenna operation (SISO) and multiple antenna operation (MIMO), with improved performance gained from the SISO case by implementing a Modal antenna technique. The Modal antenna provides the capability of activating only one communication port on the transceiver and maintaining better antenna performance due to the multiple radiation patterns, or modes, available from the Modal antenna. Other features and embodiments are disclosed in the following detailed description of the preferred embodiments.

BRIEF DESCRIPTION OF THE DRAWINGS

FIG. 3 illustrates a table which defines five categories of operation under the for LTE operation.

DETAILED DESCRIPTION OF THE PREFERRED EMBODIMENTS

Figure 1A:
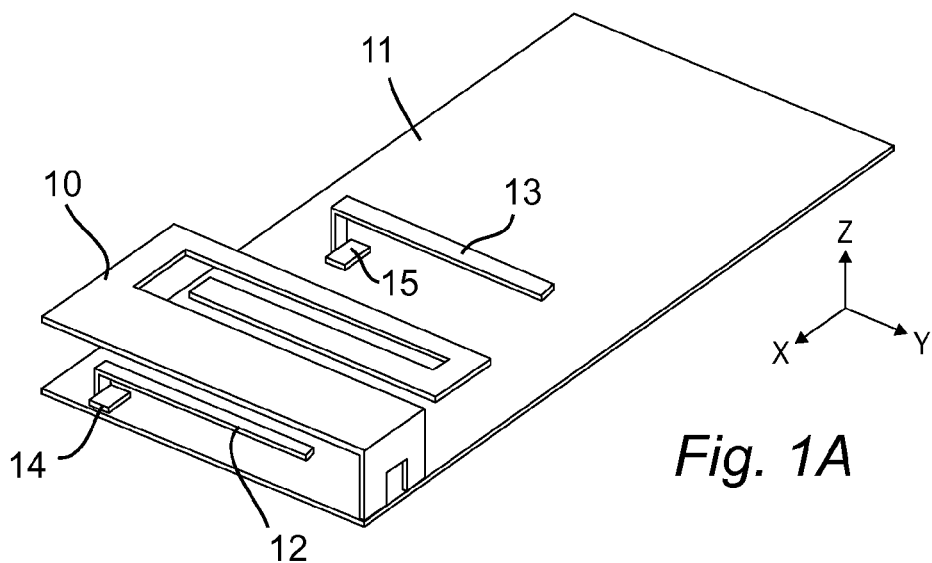
FIGS. 1(A-C) illustrate a modal antenna adapted for beam steering and band-switching using offset parasitic elements coupled to respective active tuning elements.

Commonly owned U.S. Pat. Nos. 7,830,320 and 7,911,402 describe antennas and methods for active band switching and a beam steering technique, respectively, wherein a single antenna is capable of generating multiple radiating modes; the contents of which are incorporated by reference. These antennas being capable of generating multiple antenna radiation modes are herein referred to as "modal antennas". These band switching (frequency shifting) and beam steering techniques are effectuated with the use of offset parasitic elements strategically disposed adjacent to the antenna radiator and adapted to alter the current distribution on the driven antenna as the reactive load on the parasitic is varied.

One application identified for this technique includes a novel receive diversity technique described in U.S. patent application Ser. No. 13/227,361, filed Sep. 7, 2011, titled "MODAL ANTENNA WITH CORRELATION MANAGEMENT FOR DIVERSITY APPLICATIONS", wherein a single modal antenna can be configured to generate multiple radiating modes to provide a form of switched diversity; the contents of which are incorporated by reference. Benefits of this technique include the reduced volume required in the mobile device for a single antenna instead of a two antenna receive diversity scheme, reduction in receive ports on the transceiver from two to one, and the resultant reduction in current consumption from this reduction in receive ports.

In one embodiment of the invention, two Modal antennas are combined to form a two antenna MIMO antenna system, where each Modal antenna is capable of generating multiple radiating modes, each mode possessing a unique radiation pattern when compared to other modes of the modal antenna. An algorithm is implemented which surveys the various modes of the two Modal antennas, and selects the mode with the best Channel Quality Indicator (CQI), such as signal to noise ratio (SNR); signal plus interference to noise ratio (SINR); receive signal strength indicator (RSSI), bit error rate (BER) and other metrics. If the data rate meets the minimum requirement for Category 1 operation then the communication port connected to the Modal antenna not in use is powered off to reduce power consumption for the communication device. Thus, the antenna can be configured to determine if the signal meets a pre-determined requirement, such as the minimum requirement for Category 1 operation, and then perform a subsequent action such as turning on/off one or more additional antennas.

In another embodiment, one of the two antennas is a typical passive antenna which possesses a single radiation pattern, or radiating mode. The second antenna is a modal antenna which is capable of generating multiple radiating modes. An algorithm is implemented which surveys the various modes of the one modal antenna, and selects the mode with the best CQI for operation. The CQI of the passive antenna is also surveyed. The best antenna and mode is selected for operation. If the data rate meets the minimum requirement for Category 1 operation then the communication port connected to the antenna not in use is powered off to reduce power consumption for the communication device. By turning off unnecessary ports and antennas, the overall system can be adapted to save power resources, providing a much longer battery life without sacrificing the quality of the signal.

In another embodiment, data rates equivalent to Category 5 LTE operation can be achieved with less than four antennas in a MIMO system by utilizing two or three modal antennas. An algorithm is implemented to determine the two optimal modal antennas to use in a two by two MIMO antenna system. If the required data rate for Category 5 LTE cannot be achieved with two modal antennas, a third modal antenna is activated to form a three antenna MIMO system. If the required data rate is still not achieved, the fourth modal antenna is activated to form a four antenna MIMO system. If Category 5 LTE can be implemented with less than four transceiver ports, a resultant power saving will be realized as the unused ports are powered off.

The '402 patent referenced above will now be discussed in more detail with reference to certain figures. In sum, a beam steering technique is effectuated with the use of a driven antenna element and one or more offset parasitic elements that alter the current distribution on the driven antenna as the reactive load on the parasitic is varied. More specifically, one or more of the parasitic elements can be positioned for band-switching, i.e. within the antenna volume created by the driven element and the circuit board, and one or more additional parasitic elements may be positioned outside the antenna volume and adjacent to the driven element to effectuate a phase-shift in the antenna radiation pattern. Multiple modes are generated, each mode characterized by the reactance or switching of parasitic elements, and thus this technique can be referred to as a "modal antenna technique", and an antenna configured to alter radiating modes in this fashion can be referred to as an "active multimode antenna" or "active modal antenna".

Figure 1B:
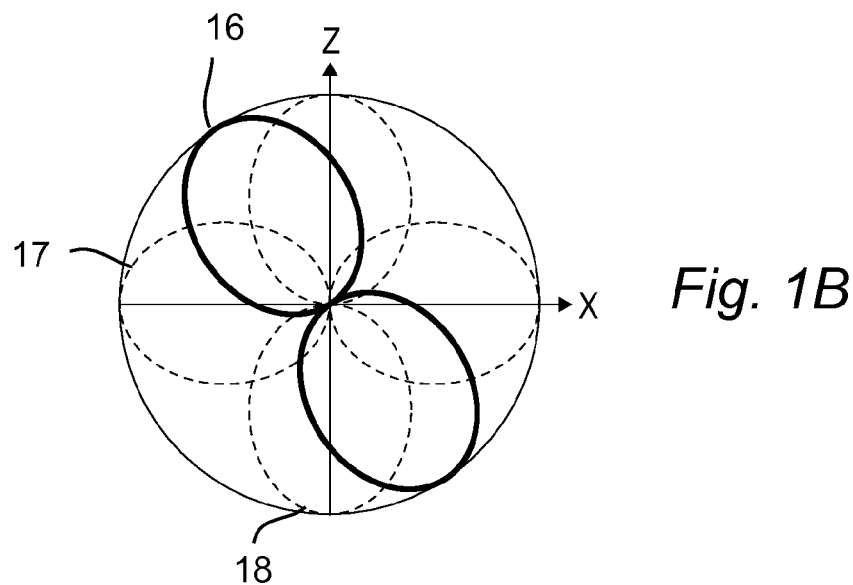
Figure 1C:
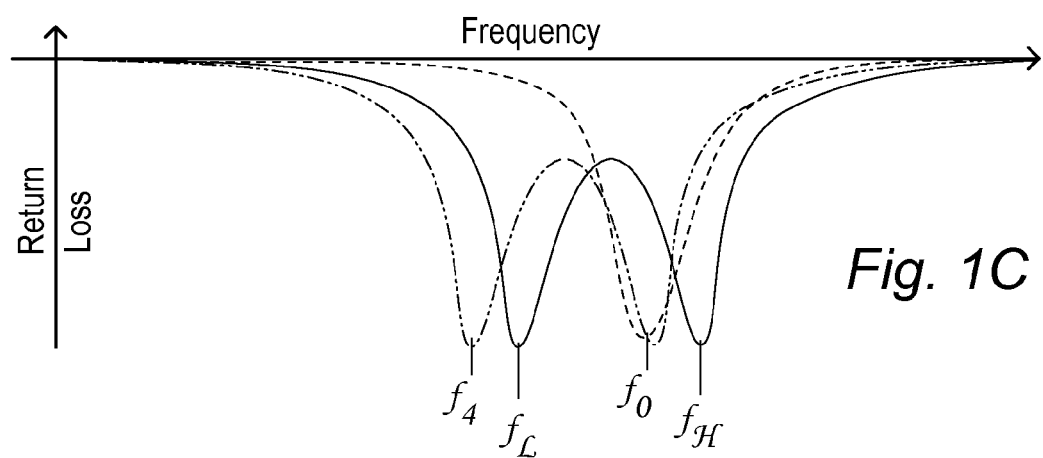

Now turning to the drawings, FIGS. 1(A-C) illustrate an example of an active modal antenna in accordance with the '402 patent, wherein FIG. 1A depicts a circuit board 11 and a driven antenna element 10 disposed thereon, a volume between the circuit board and the driven antenna element forms an antenna volume. A first parasitic element 12 is positioned at least partially within the antenna volume, and further comprises a first active tuning element 14 coupled therewith. The first active tuning element 14 can be a passive or active component or series of components, and is adapted to alter a reactance on the first parasitic element either by way of a variable reactance, or shorting to ground, resulting in a frequency shift of the antenna. A second parasitic element 13 is disposed about the circuit board and positioned outside of the antenna volume. The second parasitic element 13 further comprises a second active tuning element 15 which individually comprises one or more active and passive components. The second parasitic element is positioned adjacent to the driven element and yet outside of the antenna volume, resulting in an ability to steer the radiation pattern of the driven antenna element by varying a current flow thereon. This shifting of the antenna radiation pattern is a type of "antenna beam steering". In instances where the antenna radiation pattern comprises a null, a similar operation can be referred to as "null steering" since the null can be steered to an alternative position about the antenna. In the illustrated example, the second active tuning element comprises a switch for shorting the second parasitic to ground when "On" and for terminating the short when "Off". It should however be noted that a variable reactance on either of the first or second parasitic elements, for example by using a variable capacitor or other tunable component, may further provide a variable shifting of the antenna pattern or the frequency response. FIG. 1C illustrates the frequency ($f_0$) of the antenna when the first and second parasitic are switched "Off"; the split frequency response ($f_L$; $f_H$) of the antenna when the second parasitic is shorted to ground; and the frequencies ($f_4$; $f_0$) when the first and second parasitic elements are each shorted to ground. FIG. 1B depicts the antenna radiation pattern in a first mode 16 when both the first and second parasitic elements are "Off"; in a second mode 17 when only the second parasitic is shorted to ground; and a third mode 18 when both the first and second parasitic elements are shorted "On". Further details of this active modal antenna can be understood upon a review of the '402 patent; however generally one or more parasitic elements can be positioned about the driven element to provide band switching (frequency shifting) and/or beam steering of the antenna radiation pattern which is actively controlled using active tuning elements.

Figure 2:
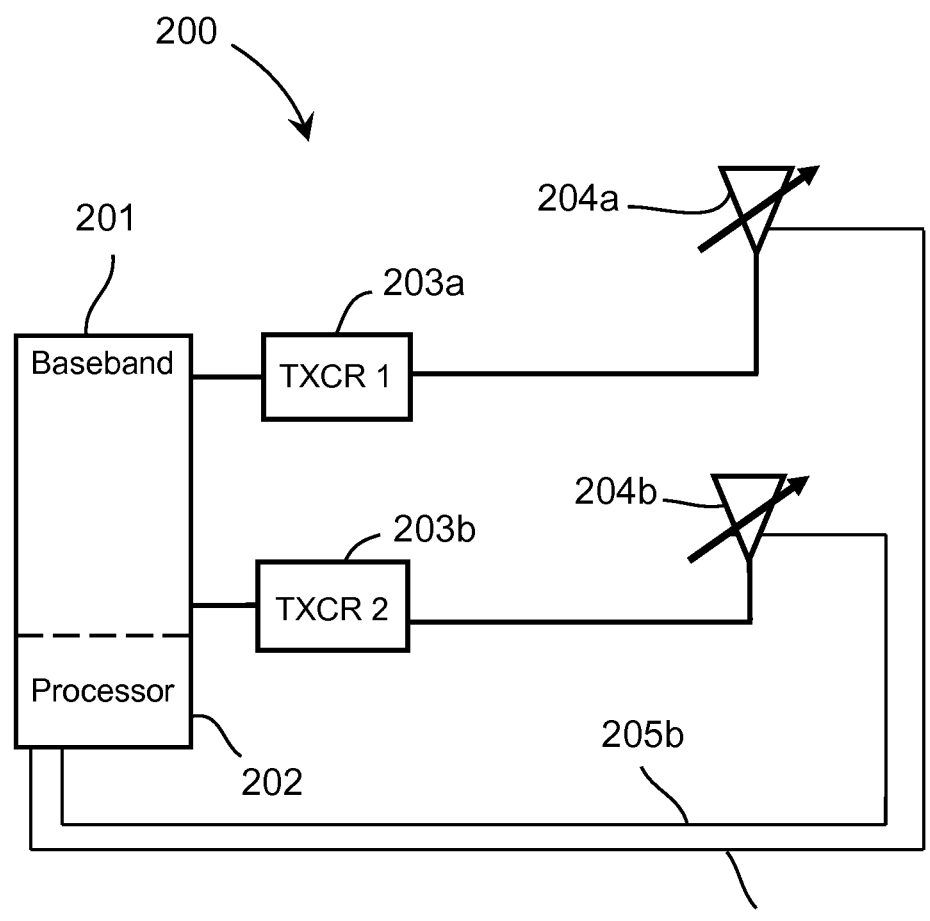
FIG. 2 illustrates a two-antenna configuration wherein modal antennas are used to form a MIMO antenna system.

FIG. 2 illustrates a two antenna configuration where modal antennas are used to form a MIMO antenna system. An algorithm resident in memory executable by the baseband processor, or a separate applications processor, is configured to monitor throughput while radiating modes are selected and to identify an antenna mode that provides the best or optimum throughput. The MIMO system 200 comprises a processor 202 resident in the device baseband 201, or a separate processor, which is adapted to control an operating mode of each of the modal antennas 204a; 204b, by way of sending control signals through transmission lines 205a; 205b, from the processor to one or more active tunable components of the modal antennas, respectively. Each of the respective modal antennas is connected to the system through a transceivers, such as transceiver 1 203a for the first modal antenna 204a, and transceiver 2 203b for the second modal antenna 204b. In this regard, the processor is adapted to determine an optimum mode for operating one of the two modal antennas in a SISO application, or both of the modal antennas in a MIMO application, depending on signal quality and other requirements.

The algorithm can be programmed by those having skill in the art to monitor throughput, select a number of antennas for operation, select preferred mode for each antenna, power down unused TXCR ports, or other similar functions. In this regard, the embodiment of FIG. 2 provides an active modal two-antenna system capable of single or multi-antenna operation depending on the data rate requirements. A single modal antenna provides increased data rate for Category 1 operation compared to a single passive antenna. When utilizing a single antenna operation, the device is adapted to conserve power.

FIG. 3 illustrates a first table, Table 4.1-1 "Downlink physical layer parameter values set by the field ue-Category", which defines five categories of operation under the 3GPP standard for LTE operation, as well as a second table, Table 4.1-2 "Uplink physical layer parameter values set by the field ue-Category". These data figures can be implemented in a lookup table and accessed by the processor for comparison with current and prospective antenna modes of the one or more antennas in the antenna system. One of multiple options may be selected by the system for operation. Option 1 is a Single Input Single Output (SISO) standard where one antenna operation is allowed if minimum throughput requirements are met. With only one antenna and associated port, device power can be significantly conserved when compared to an embodiment where two or more antennas are utilized. Option 2 comprises a default mode if modal function is turned off, the antenna system functions as a MIMO system with passive antennas. Option 3 provides one modal antenna with one passive antenna in a MIMO configuration. In this regard, the modal antenna of Option 3 provides a signal improvement over the embodiment of Option 2 (passive antennas). Additionally, Option 4 comprises a MIMO application where two modal antennas provide maximum throughput.

Figure 4A:
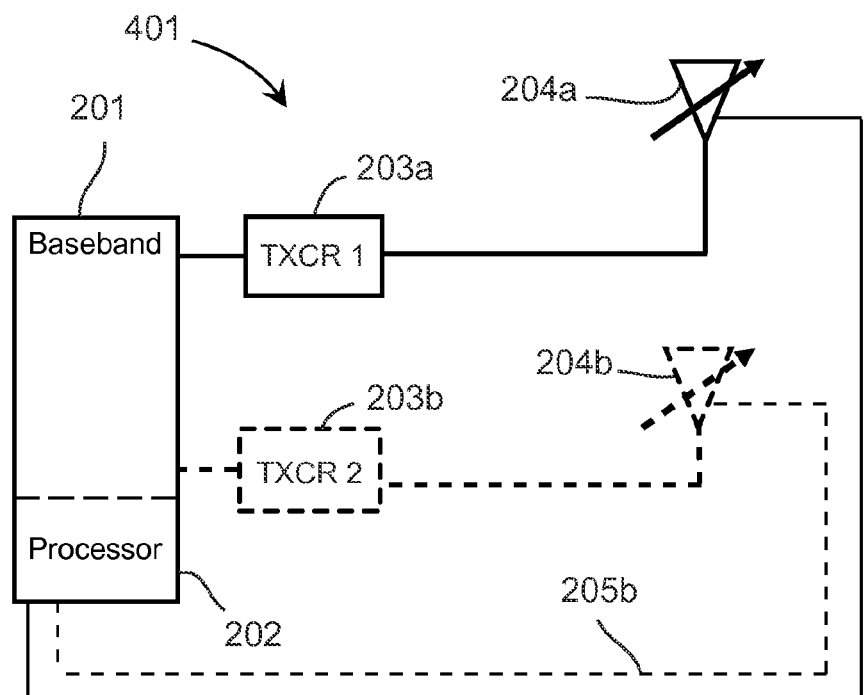
FIGS. 4(A-B) illustrate a block diagram of a two-antenna system for MIMO applications utilizing modal antennas.
Figure 4B:
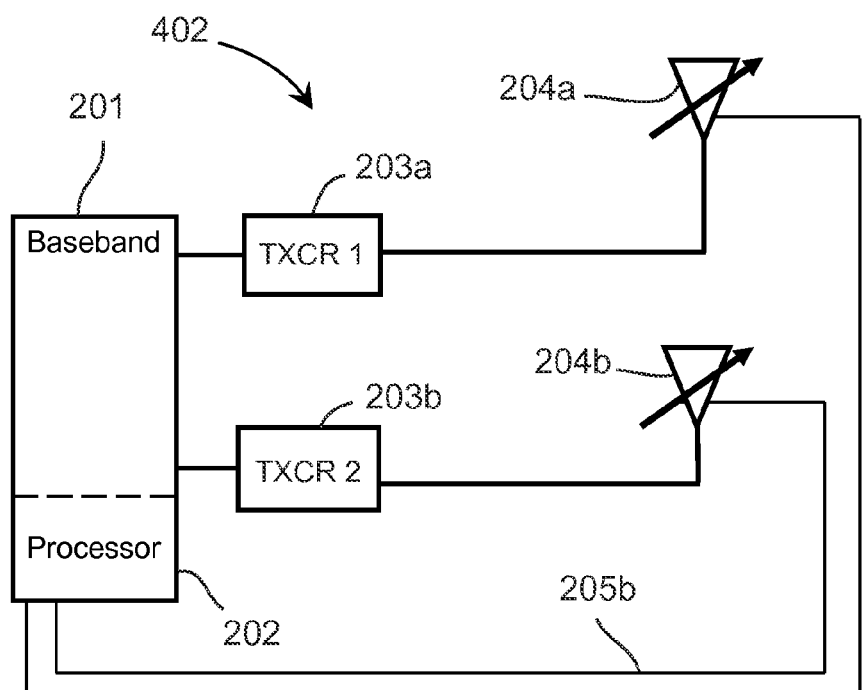

FIGS. 4(A-C) illustrate block diagrams of a two-antenna system for MIMO applications utilizing modal antennas. The Category 1 antenna configuration is satisfied with a single antenna and transceiver, while Categories 2, 3, and 4 operation require a two antenna MIMO configuration.

FIG. 4A illustrates the two-modal antenna MIMO system operating in a first state 401, wherein the second antenna 204b and second transceiver 203b are shut off and the first antenna 204a is adapted to operate in a SISO function, meeting Category 1 requirements. However, when the single antenna is not capable of meeting Category 1 requirements, or when additional requirements are in demand, the antenna can reconfigure into a second state 402, wherein both the first and second modal antennas 204a; 204b, respectively, are turned on and the antenna system functions in a MIMO configuration, for example where Category 2, 3, 4 requirements are in demand.

Figure 5A:
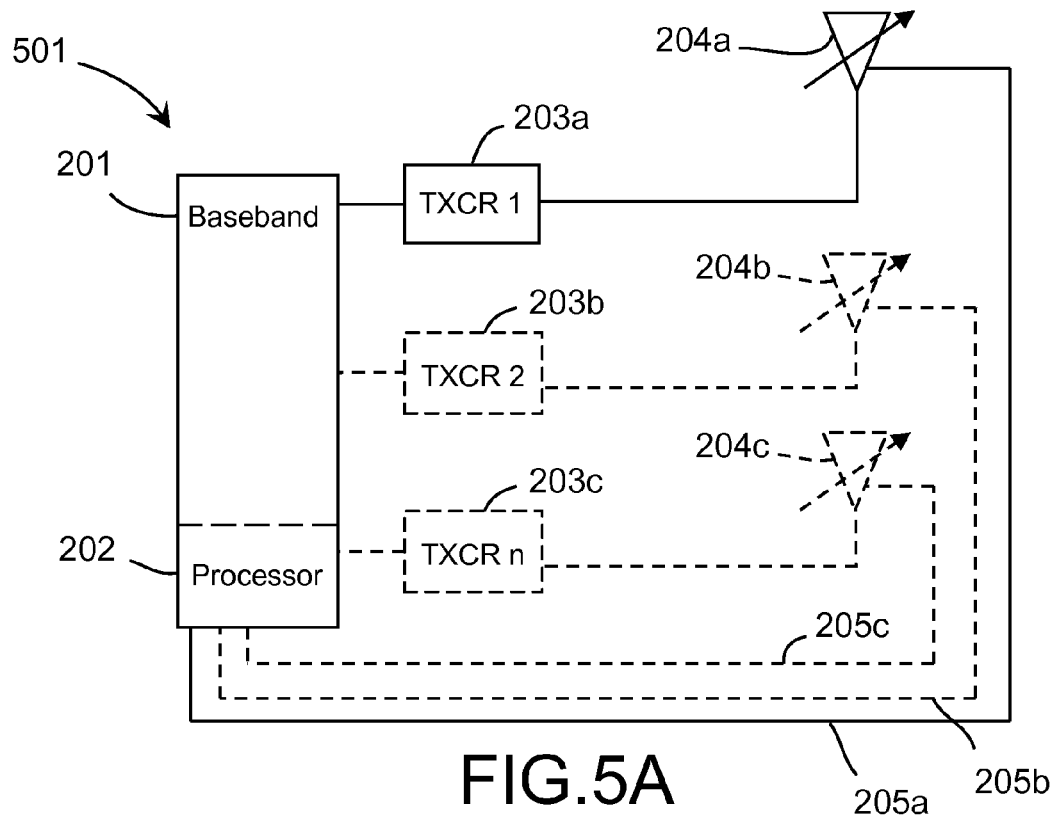
FIGS. 5(A-B) illustrate a block diagram of an "m" antenna system for MIMO applications utilizing modal antennas
Figure 5B:
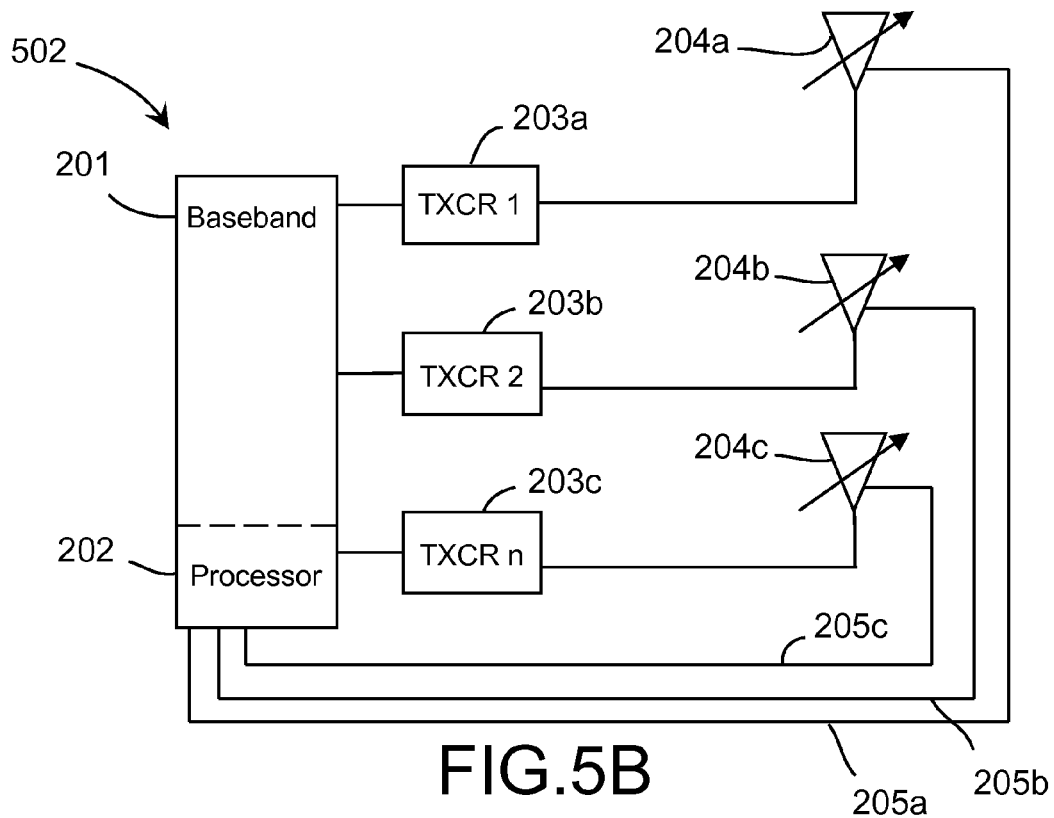

FIG. 5(A-B) illustrates a block diagram of an "m" antenna system for MIMO applications utilizing modal antennas. The Category 1 antenna configuration is satisfied with a single antenna and transceiver, while Categories 2, 3, and 4 can be implemented with "m" antennas 204(a-c). The "m" antennas are coupled to "n" transceivers, where m=n. Although each of the antennas illustrated comprises a modal antenna, it is possible to incorporate one or more passive antennas having a single antenna mode. In FIG. 5A, a single modal antenna is configured to operate in a SISO configuration meeting Category 1 requirements. In FIG. 5B, "m" antennas are utilized in a MIMO system for meeting Category 2, 3, and 4 requirements.

Figure 6:
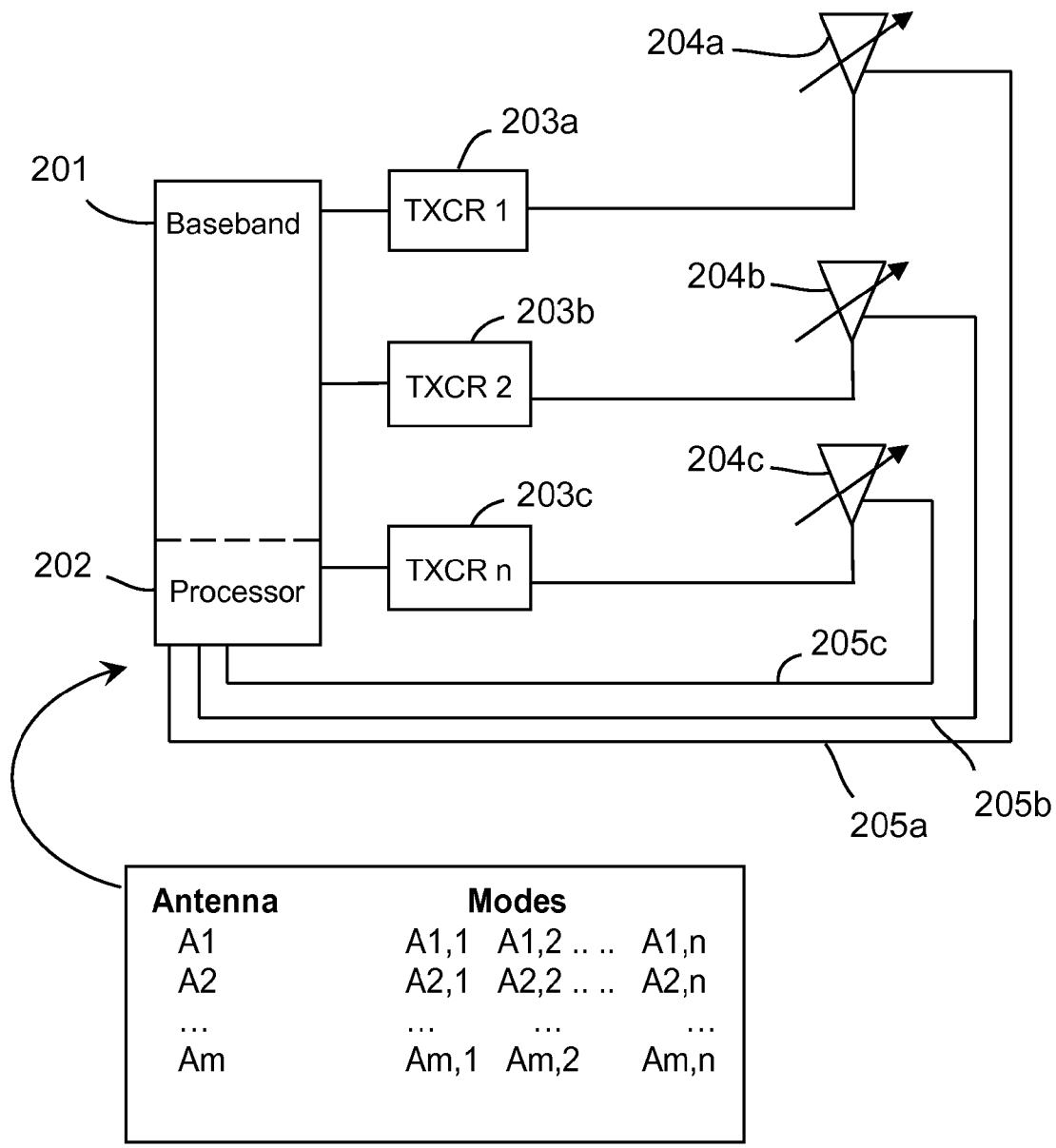
FIG. 6 illustrates an "m" antenna system of Modal antennas wherein each Modal antenna has "n" modes.

FIG. 6 further illustrates an "m" antenna system, comprising up to "m" antennas, wherein "m" is greater than or equal to two. Each Modal antenna is adapted to function at up to "n" unique modes, wherein the antenna comprises a unique radiation pattern in each mode. A table defines the ("m")×("n") modes that are available for selection and use for Category 1 operation.

Figure 7:
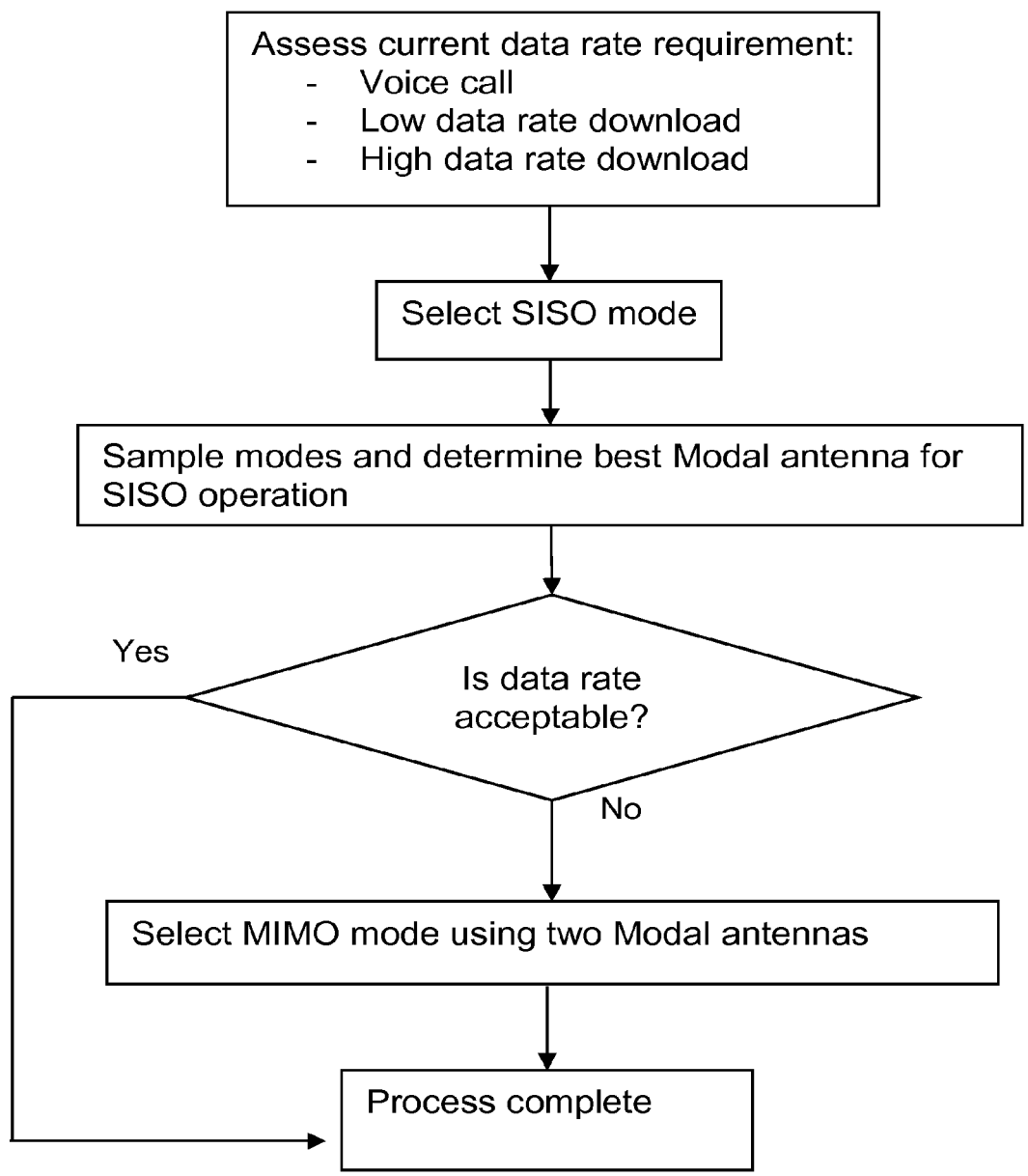
FIG. 7 illustrates an algorithm adapted to determine an optimal antenna and mode to operate in Category 1 mode, and when to switch to a two-antenna MIMO scheme.

FIG. 7 illustrates an algorithm to determine the optimal antenna and mode to operate in Category 1 mode, and when to switch to a two antenna MIMO scheme. In a first operation, the device is accessed to determine a current data rate requirement, such as a voice call, low data rate download, high data rate download, or perhaps a static mode wherein the device is pinging the towers for maintaining a connection. Once the data rate requirement is determined, the antenna selects a SISO mode having optimum CQI. The signal is sampled to determine which antenna, and in which mode, if any, optimum CQI is achieved, and whether in the preferred SISO mode the antenna meets minimum requirements. If the signal fails to meet minimum requirements, the antenna system is configured to operate in a MIMO configuration. If, however, requirements are met, the antenna operates with the single antenna in a SISO configuration having the modal antenna configured in the optimum mode. A resampling can be performed at a recurring time interval, or as data requirements are changed, for example upon start or completion of a data download process.

Figure 8A:
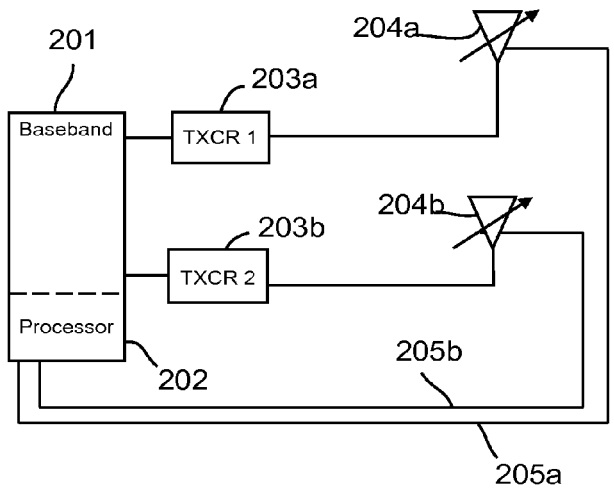
FIGS. 8(A-C) illustrate several configurations utilizing Modal antennas adapted to satisfy LTE Category 5 operation using two, three, and four Modal antennas, respectively.
Figure 8B:
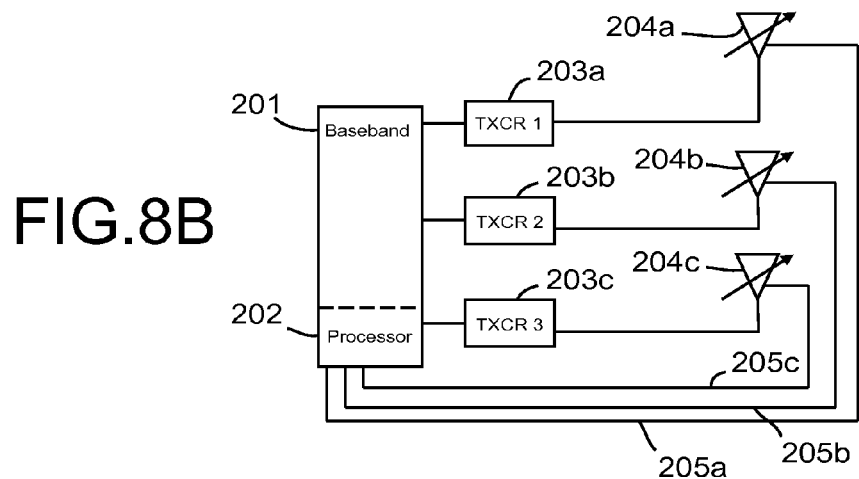
Figure 8C:
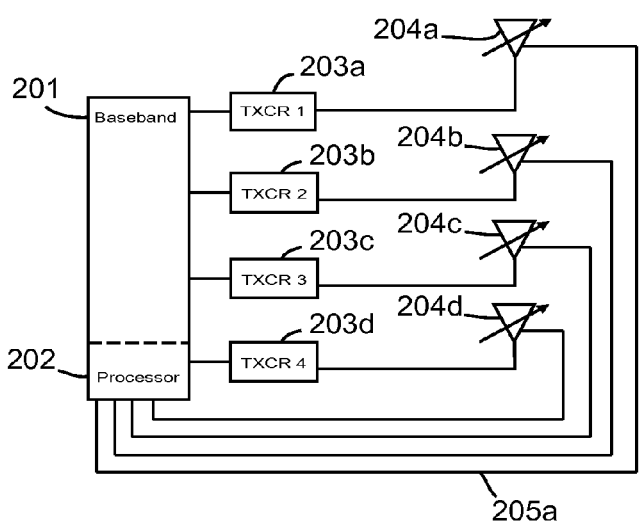

FIG. 8(A-C) illustrates three antenna configurations utilizing Modal antennas to satisfy LTE Category 5 operation using two, three, and four Modal antennas. First, a two-antenna system is sampled for signal quality metric as illustrated in FIG. 8A. If the signal meets minimum requirements, the antenna may improve signal quality by reconfiguring a mode of one or both of the two antennas. If the signal quality fails to meet minimum requirements, a third antenna can be powered on and sampled for configuration at an optimum mode as illustrated in FIG. 8B. If still the three antennas fail to meet minimum Category 5 requirements, a fourth antenna can be powered on and configured in an optimum mode as illustrated in FIG. 8C. In this regard, the antenna system is adapted to find the least required antennas and optimum states thereof for meeting Category 5 requirements. The least required antennas will provide the lowest power consumption.

Although various embodiments have been described with reference to the figures, it should be understood that variations in the described embodiments can be accomplished by those having skill in the art such that a similar result is achieved. Accordingly, the illustrated examples are not intended to limit the spirit and scope of the invention as set forth in the claims.

We claim:

1. An antenna system, comprising:
  a first modal antenna configurable in one of a plurality of first antenna modes associated therewith, each of said first antenna modes providing a distinct antenna radiation pattern of the first modal antenna, wherein the first modal antenna is adapted for varying a radiation pattern thereof upon a change in corresponding first antenna mode;
  a second modal antenna configurable in one of a plurality of second antenna modes associated therewith, each of said second antenna modes providing a distinct antenna radiation pattern of the second modal antenna, wherein the second modal antenna is adapted for varying a radiation pattern thereof upon a change in corresponding second antenna mode;
  a processor coupled to the first and second modal antennas and adapted to execute an algorithm configured to select one of the first and second modal antennas and a mode thereof for providing an optimum Channel Quality Indicator (CQI);

wherein the algorithm initiates a decision process adapted to determine if throughput of a single antenna of the first and second modal antennas meets pre-determined requirements;

wherein operation of said single antenna of the modal antennas is maintained if the pre-determined requirements are met; and wherein both the first and second modal antennas are enabled if throughput does not meet the pre-determined requirements, resulting in operation of said first and second antennas in a two-antenna MIMO system.

2. The antenna system of claim 1, wherein said pre-determined requirements comprise requirements for Category 1 LTE operation.

3. The antenna system of claim 1, wherein three or more antennas are combined to form an "m" element MIMO antenna system, where "m" is equal to or greater than three.

4. The antenna system of claim 3, wherein each of said "m" antennas individually comprises a modal antenna having multiple antenna modes, or a passive antenna structure having a single antenna mode.

5. The antenna system of claim 4, wherein the algorithm is configured to survey the throughput of each of the modal antennas along with the power consumption requirements of each communication port associated with the antennas and initiate a decision process to optimize the communication system for power consumption and data throughput.

6. An antenna system, comprising:
a first modal antenna configurable in one of a plurality of first antenna modes, each of said first antenna modes providing a distinct antenna radiation pattern of the first modal antenna, wherein the first modal antenna is adapted for varying a radiation pattern thereof upon a change in corresponding first antenna mode;
a second antenna, said second antenna comprising a passive antenna structure having one mode of operation resulting in one distinct radiation pattern thereof,
a processor coupled to the first modal antenna, the processor programmed to execute an algorithm configured to initiate a decision process for determining if throughput of the first modal antenna meets the pre-determined requirements;
wherein operation of said first modal antenna is maintained if the pre-determined requirements are met; and
wherein both the first modal antenna and second antenna are enabled if throughput does not meet the pre-determined requirements, resulting in a two antenna MIMO system.

7. The antenna system of claim 6, wherein said pre-determined requirements comprise requirements for category 1 LTE operation.

8. An antenna system, comprising:
four or more antennas, wherein said four or more antennas are combined to form an "m" element MIMO antenna system, wherein "m" is equal to or greater than four, said antennas comprising at least one modal antenna having a plurality of antenna modes and up to "m−1" passive antennas having a single antenna mode;
a processor coupled to said at least one modal antenna, the processor adapted to execute an algorithm configured to select a first pair of two antennas from the "m" element MIMO antenna system, the first pair being configured to provide an optimum Channel Quality Indicator (CQI) for Categories 2, 3, and 4 LTE operation; and
when Category 5 LTE throughput is required, the processor and algorithm initiate a decision process to determine if throughput from a pair of antennas meets a pre-determined requirement for system operation;
wherein if the pre-determined requirement is met then the two antenna operation is maintained;
wherein if throughput does not meet the pre-determined requirement, a third antenna is used to form a three antenna MIMO system; if the pre-determined requirement is met then the three antenna operation is maintained; and
wherein if throughput does not meet the pre-determined requirement, a fourth antenna is used to form a four antenna MIMO system.

* * * * *